United States Patent [19]

Abramson et al.

[11] 3,940,324

[45] Feb. 24, 1976

[54] METHOD OF DECOMPOSING CALCIUM CARBONATE

[76] Inventors: Iosif Gershevich Abramson, Varshavskaya ulitsa, 22, kv. 16, Leningrad, U.S.S.R.; Vasily Andreevich Glukhikh, Belgradskaya ulitsa, 10, korpus 1, kv. 5, Leningrad, U.S.S.R.; Solomon Isaakovich Danjushevsky, ploschad Chernyskevskogo, 7, kv. 79, Leningrad, U.S.S.R.; Georgy Borisovich Egorov, Grazhdansky prospekt, 90, korpus 2, kv. 103, Leningrad, U.S.S.R.; Raisa Andreevna Zozulya, 9 linia, 76, kv. 7, Leningrad, U.S.S.R.; Jury Vasilievich Nikiforov, Zanevsky prospekt, 30, kv. 23, Leningrad, U.S.S.R.; Rafail Manusovich Nudelman, Nevsky prospekt 61, kv. 1, Leningrad, U.S.S.R.; Alexandr Mikhailovich Khomyakov, Ivanovskaya ulitsa, 18, kv. 15, Leningrad, U.S.S.R.; Yanetta Markovna Tseitlin, prospekta Veteranov, 40, kv. 10, Leningrad, U.S.S.R.; Evgeny Grigorievich Komar, deceased, late of Leningrad, by Khaya Semenovna Boguslavskaya, Kuznetsovskaya ulitsa 36, 26, Leningrad, U.S.S.R., administratrix; Olga Efremova Komar ulitsa, Grazhdanskaya 16, Kv. 11, Pushkin Leningradskoi oblasti, U.S.S.R., administratirx; Alexandr Eugenievich Komar, Kuznetsovskaya ulitsa, 36, Kv. 26, Leningrad, U.S.S.R., administrator.

[22] Filed: Dec. 4, 1974

[21] Appl. No.: 529,516

[52] U.S. Cl. .................................. 204/157.1 H
[51] Int. Cl.² ........................................ B01J 1/10
[58] Field of Search ....................... 204/157.1 H

[56] References Cited
UNITED STATES PATENTS 3,803,010   4/1974   Seaman................... 204/157.1 H

*Primary Examiner*—Howard S. Williams
*Attorney, Agent, or Firm*—Holman & Stern

[57] ABSTRACT

The method consists of decomposing calcium carbonate into carbon dioxide gas and calcium oxide under the effects of an ionizing radiation dose at a minimum power of absorbed radiation equal to 0.5 Mrad/s.

The advantageous feature of the method resides in that it takes much less time to occur, viz., a few minutes and even seconds rather than several scores of hours, and requires no vacuum to occur.

6 Claims, No Drawings

METHOD OF DECOMPOSING CALCIUM CARBONATE

BACKGROUND OF THE INVENTION

The invention relates to chemical engineering and has particular reference to methods of decomposing calcium carbonate into calcium oxide and carbon dioxide gas. As is commonly known, both of said products find extensive applications in some various branches of industry. Calcium oxide, for instance, is widely used in the building practice as a binder.

At present it is widely known to use a thermal method for decomposing calcium carbonate into calcium oxide and carbon dioxide gas. The known method practically resides in that natural limestone is calcined at from 1000° to 1200°C in special kilns.

The cardinal disadvantages inherent in said method resides in that it involves much heat added from external sources which, in turn, requires much fuel expenditure and, moreover, the process is rather lengthy; thus, under industrial conditions the process for the thermal decomposition of calcium carbonate is known to take several hours to complete.

Recently, another method of decomposing calcium carbonate into calcium oxide and carbon dioxide gas has become known which exposes the starting material to an ionizing radiation, and in particular, to gamma radiation.

So far the said method is carried into effect under high vacuum, and in particular, at a vacuum in the working chamber on the order of $10^{-4}$ mm Hg, and with a power of absorbed radiation dose as low as some hundredths of a kilorad per second (cf., e.g., Proceedings of the Tashkent conference on peaceful use of atomic energy, "Radiolysis of some inorganic compounds in an intense gamma-field" by I. M. Blaunstein and S. V. Stardubtsev, vol, I, pp. 163–168, published by the Academy of Sciences of the Uzbek SSR, Tashkent, 1961/in Russian/).

The said method is advantageous over the thermal one in that it involves no external heat addition, which is indispensable in the known method, and requiring great amounts. However, said method involving the use of an ionizing radiation suffers from some disadvantages, such as its long duration, its taking up to several hundredths of hours for calcium carbonate to completely decompose, as well as, as stated above, the method involves high vacuum which much hampers its industrial application due to difficulties in providing a hermetically sealed working chamber under industrial conditions.

SUMMARY OF THE INVENTION

It is a primary object of the present invention to provide improvements for a method of decomposing calcium carbonate by virtue of an ionizing radiation.

It is a specific object of the present invention to provide optimum radiation conditions, i.e., optimum power values of absorbed radiation dose.

It is a further object of the invention to substantially reduce the duration of the process, and dispense with any addition of external heat; to rule out the use of vacuum; and to make the method extensively applicable under industrial conditions.

Other objects and advantages of the invention will become more obvious from the disclosure that follows.

Said objects are attained due to the fact that upon decomposing calcium carbonate into calcium oxide and carbon dioxide gas by exposure to an ionizing radiation, according to the invention, decomposition occurs at an absorbed dose power of not less than 0.5 Mrad/s. This enables the process time to be cut down to minutes and even seconds. Whenever the resulting calcium oxide is intended to be used as a binder and when it is necessary that it possess a reasonably high reactivity, the calcium carbonate decomposition process is expediently run at an absorbed dose powers of from 0.5 to 10 Mrad/s.

In order to obtain calcium oxide suitable for making high refractory calcium carbonate decomposition, it is expedient to operate at a power of absorbed dose in excess of 10 Mrad/s.

Given below is a detailed disclosure of the invention with the specific illustrative embodiments thereof referred to with specific examples of practical realization of the proposed method.

The method consists in that calcium carbonate, ordinarily, naturally occurring limestone, is exposed to the effect of an ionizing radiation at a power of absorbed radiation of from 0.5 Mrad/s and over. The upper limit of the power of absorbed dose can be considered as practically unrestricted, insofar as an increase in the power of the absorbed dose results practically in a reduced decomposition time of calcium carbonate. However, it should not be overlooked that an increase in the power of absorbed dose might in some way or another influence upon the variation in the properties of calcium oxide. Thus, for instance, when the intended use for calcium oxide is a binder, it is quite reasonable that the power of the absorbed dose be within 10 Mrad/s.

Whenever calcium oxide is intended for subsequent production of high-refractory materials, the decomposition process is expediently conducted at higher power values of absorbed dose, viz., from 10 Mrad/s and over. Besides, as experiments have shown, carrying out the process at power values of absorbed radiation higher than 50 Mrad/s is not justified from standpoint of economy.

The ionizing radiation may be both gamma-rays and fluxes of accelerated electrons. In both cases the decomposition process will proceed successfully.

The process of calcium carbonate decomposition occurs in the heretofore known installations suitable for carrying out the same processes at the lower values of the power of absorbed dose, with the very point of difference residing in that the method proposed herein involves no vacuum in the working chamber, whereby the provision of the hermetically sealed working chamber is no longer necessary and, besides, the source of an ionizing radiation must be replaced by a more powerful one.

The known installations for decomposing calcium carbonate are essentially rather simple ones and find reasonably extensive applications, of which are left beyond the scope of the present disclosure, and they are not considered to make part of the present invention. Equally, no detailed description of the ionizing radiation sources is contained in the present disclosure, since such sources are of common knowledge and any information thereon is readily available. Some difficulties may be encountered because ionizing radiation sources suitable for industrial applications must be provided. So far as our knowledge goes, no such sources are hitherto developed. The inventors are aware of developing industrial designs of such sources which are now under way in the Soviet Union, and that applications will before long be filed for appropriate inventions. Our method, involves no addition of external heat, occurs at atmospheric pressure, and is featured by a substantially increased, practically complete yield of the end products which exceeds 95 percent.

EXAMPLES OF THE PREFERRED EMBODIMENTS

Some examples of practical embodiment of the proposed method are given hereinbelow.

EXAMPLE 1

Chemically pure powdery calcium carbonate in an amount of 100 g with a mass layer thickness of 2 g/cm$^2$ was irradiated by a flux of electrons accelerated to an energy of 4.5 MeV, with the process taking place in air at atmospheric pressure and normal (room) ambient temperature, and with the power of the absorbed dose being 0.5 Mrad/s.

Ignition losses in samples that have undergone a 40-minute exposure are equal to 4.1 percent, while the free calcium oxide content amounts to 86.2 percent. When the product is slaked, a vigorous effervescence is observed.

EXAMPLE 2

Ground and compressed natural limestone in an amount of 500 g with a mass layer thickness of 0.6 g/cm$^2$, and containing 94 percent $CaCO_3$ was exposed to a flux of electrons accelerated to an energy of 1.5 MeV in air at atmospheric pressure and normal ambient temperature, with the power of absorbed dose being 0.67 Mrad/s.

Samples exposed to a 20-minute irradiation feature ignition losses equal to 4.0 percent, and the content of free calcium oxide, to 90.2 percent. When slaked, the product manifests a vigorous effervescence.

EXAMPLE 3

Chemically pure compressed calcium carbonate in an amount of 200 g with a mass layer thickness of 1.6 g/cm$^2$ was exposed to a flux of electrons accelerated to an energy of 4.0 MeV in air at atmospheric pressure and normal ambient temperature, with the power of the absorbed dose being 1.0 Mrad/s.

Samples exposed to a 15-minute irradiation feature ignition losses equal to 2.6 percent, with the content of free calcium oxide amounting to 91.5 percent. When slaked, the product shows a vigorous effervescence.

EXAMPLE 4

Natural limestone with a 97-percent content of $CaCO_3$, ground to a powderlike state, was in an amount of 400 g with a mass layer thickness of 0.6 g/cm$^2$ and exposed to a flux of electrons accelerated to an energy of 1.5 MeV in air at atmospheric pressure and normal ambient temperature, with the power of the absorbed dose being 2.0 Mrad/s.

Samples exposed to a 7-minute irradiation feature ignition losses equal to 0.6 percent, with the content of free calcium oxide amounting to 95 percent. When slaked, the product shows a vigorous effervescence.

EXAMPLE 5

Chemically pure powdery calcium carbonate in an amount of 20 g with a mass layer thickness of 2.0 g/cm$^2$ was exposed to a flux of electrons accelerated to an energy of 4.5 MeV, in air at atmospheric pressure and an ambient temperature of 20°C, with the power of the absorbed dose being 8.16 Mrad/s.

Samples exposed to a 3-minute irradiation feature no ignition losses, with the content of free calcium oxide amounting to 99.3 percent. When slaked, the product shows effervescence.

EXAMPLE 6

Chemically pure powdery calcium carbonate in an amount of 50 g with a mass layer thickness of 3.0 g/cm$^2$ was exposed to a flux of electrons accelerated to an energy of 7.2 MeV, in air at atmospheric pressure and an ambient temperature of 25°C, with the power of the absorbed dose being 9.75 Mrad/s.

Samples exposed to an 80-second irradiation feature no ignition losses, with the content of free calcium oxide amounting to 99.5 percent. Marked reaction of the product with water is observed.

EXAMPLE 7

Ground powdery natural limestone with a $CaCO_3$ content of 94 percent, in an amount of 250 g with a mass layer thickness of 3.0 g/cm$^2$ was exposed to a flux of electrons accelerated to an energy of 8 MeV in air at atmospheric pressure and normal ambient temperature, with the power of the absorbed dose being 11.32 Mrad/s.

Samples exposed to a 60-second irradiation feature no ignition losses, with the content of free calcium oxide amounting to 98 percent. The product but slightly reacts with water, with the $Ca(OH)_2$ content being determined only by resorting to titration.

EXAMPLE 8

Chemically pure compressed calcium carbonate in an amount of 50 g with a mass layer thickness of 3.0 g/cm$^2$ was exposed to a flux of electrons accelerated to an energy of 8 MeV in air at atmospheric pressure and normal ambient temperature, with the power of the absorbed dose being 20.6 Mrad/s.

Samples exposed to a 30-second irradiation feature no ignition losses, with the content of free calcium oxide amounting to 99.8 percent. The product reacts but slightly with water, with a negligible concentration of $Ca(OH)_2$ being determined tetrimetrically.

EXAMPLE 9

Chemically pure compressed calcium carbonate in an amount of 120 g with a mass layer thickness of 3.0 g/cm$^2$ was exposed to a flux of electrons accelerated to an energy of 7.8 MeV in air at atmospheric pressure and normal ambient temperature, with the power of the absorbed dose being 46.1 Mrad/s.

Samples exposed to a 20-second irradiation feature no ignition losses, with the content of free calcium oxide amounting to 99.7 percent. The product does not practically react with water, with the traces of $Ca(OH)_2$ being determined tetrimetrically.

In all the aforestated examples use is made of both pulsed and continuous-wave electron accelerators.

What we claim is:

1. A method of decomposing calcium carbonate into calcium oxide and carbon dioxide gas, comprising exposing calcium carbonate to an ionizing radiation at a power of the absorbed radiation dose of at least 0.5 Mrad/s.

2. The method as claimed in claim 1, wherein calcium carbonate is exposed to an ionizing radiation at a power of the absorbed radiation dose of from 0.5 to 10 Mrad/s.

3. The method as claimed in claim 1, wherein calcium carbonate is exposed to an ionizing radiation at a power of the absorbed radiation dose of over 10 Mrad/s.

4. The method as claimed in claim 1, wherein the calcium carbonate source is selected from the group consisting essentially of limestone, and chemically pure calcium carbonate.

5. The method as claimed in claim 1, wherein said method conducted at atmospheric pressure and without the addition of heat.

6. The method as claimed in claim 5, wherein said method is conducted at ambient temperature.

* * * * *